US009973936B2

(12) United States Patent
Del Prado Pavon et al.

(10) Patent No.: US 9,973,936 B2
(45) Date of Patent: May 15, 2018

(54) METHOD TO ACHIEVE COEXISTENCE BETWEEN CENTRALIZED TDMA MAC AND A SECOND MAC IN WIRELESS COMMUNICATION SYSTEMS

(75) Inventors: Javier Del Prado Pavon, Ossining, NY (US); Kiran Challapali, New City, NY (US); Zhun Zhong, Croton-On-Hudson, NY (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1798 days.

(21) Appl. No.: 11/570,447

(22) PCT Filed: Jun. 10, 2005

(86) PCT No.: PCT/IB2005/051931
§ 371 (c)(1),
(2), (4) Date: Dec. 12, 2006

(87) PCT Pub. No.: WO2005/125248
PCT Pub. Date: Dec. 29, 2005

(65) Prior Publication Data
US 2008/0037476 A1    Feb. 14, 2008

Related U.S. Application Data

(60) Provisional application No. 60/579,941, filed on Jun. 15, 2004.

(51) Int. Cl.
| | |
|---|---|
| *H04B 7/212* | (2006.01) |
| *H04W 16/14* | (2009.01) |
| *H04W 28/16* | (2009.01) |
| *H04W 36/16* | (2009.01) |

(52) U.S. Cl.
CPC ............ *H04W 16/14* (2013.01); *H04W 28/16* (2013.01); *H04W 36/16* (2013.01)

(58) Field of Classification Search
CPC .............................. H04W 16/04; H04W 16/06
USPC ........ 370/337, 330–331, 336, 342, 335, 329; 455/436
See application file for complete search history.

(56) References Cited

U.S. PATENT DOCUMENTS

| | | | |
|---|---|---|---|
| 5,648,958 A | 7/1997 | Counterman | |
| 5,970,062 A * | 10/1999 | Bauchot | 370/310.2 |
| 6,009,087 A * | 12/1999 | Uchida et al. | 370/335 |

(Continued)

FOREIGN PATENT DOCUMENTS

| | | | |
|---|---|---|---|
| WO | 9517077 A1 | 6/1995 | |
| WO | WO 9517077 A1 * | 6/1995 | ............... H04Q 7/32 |
| WO | 2004057893 A1 | 7/2004 | |

OTHER PUBLICATIONS

"Performance Evaluation of a Request-TDMA/CDMA Protocol for Wireless Networks", by M.Chatterjee et al., Journal of Interconnection Networks, vol. 2, No. 1, 2001, pp. 49-67.

(Continued)

*Primary Examiner* — Qun Shen
(74) *Attorney, Agent, or Firm* — Larry Liberchuk

(57) ABSTRACT

Wireless networks and their method of implementation include a first network and one or more networks. The first network assigns designated time slots to each of the one or more networks during which at least one device of at least one of the networks may communicate with at least one other device of its respective network.

19 Claims, 3 Drawing Sheets

(56) References Cited

U.S. PATENT DOCUMENTS

| | | | |
|---|---|---|---|
| 6,122,270 A * | 9/2000 | Whinnett et al. | 370/342 |
| 6,130,886 A | 10/2000 | Ketseoglou | |
| 6,526,036 B1 * | 2/2003 | Uchida et al. | 370/342 |
| 6,754,176 B1 * | 6/2004 | Gubbi et al. | 370/230 |
| 6,795,418 B2 * | 9/2004 | Choi | 370/336 |
| 7,035,275 B2 * | 4/2006 | Liang | 370/436 |
| 7,280,836 B2 * | 10/2007 | Fuccello et al. | 455/452.1 |
| 7,406,296 B2 * | 7/2008 | Haartsen | 455/41.2 |
| 7,512,095 B2 * | 3/2009 | Johnson et al. | 370/329 |
| 2002/0071413 A1 | 6/2002 | Choi | |
| 2002/0071448 A1 | 6/2002 | Cervello | |
| 2002/0186710 A1 * | 12/2002 | Alvesalo et al. | 370/468 |

OTHER PUBLICATIONS

"A Programmable MAC Framework for Utility-Based Adaptive Quality of Service Support", by G. Bianchi et al., IEEE Journal of Selected Areas in Communications, vol. 18, No. 2, Feb. 2000.

"Contention-Free Distributed Dynamic Reservation MAC Protocol with Deterministic Scheduling for Wireless ATM Networks", by Chung Gu Kang et al., IEEE Journal on Selected Areas in Communications, vol. 18, No. 9, Sep. 2000.

\* cited by examiner

METHOD TO ACHIEVE COEXISTENCE BETWEEN CENTRALIZED TDMA MAC AND A SECOND MAC IN WIRELESS COMMUNICATION SYSTEMS

The wireless communication bandwidth has significantly increased with advances of channel modulation techniques, making the wireless medium a viable alternative to wired and optical fiber solutions. As such, the use of wireless connectivity in data and voice communications continues to increase. These devices include mobile telephones, portable computers in wireless networks (e.g., wireless local area networks (WLANS), stationary computers in wireless networks, portable handsets, to name only a few.

Each wireless network includes a number of layers and sub-layers. The Medium Access Control (MAC) sub-layer and the Physical (PHY) layer are two of these layers. The MAC layer is the lower of two sublayers of the Data Link layer in the Open System Interconnection (OSI) stack. The MAC layer provides coordination between many users that require simultaneous access to the same wireless medium.

The MAC layer protocol includes a number of rules governing the access to the broadcast medium that is shared by the users within the network. As is known, several different multiple access technologies (often referred to as MAC protocols) have been defined to work within the protocols that govern the MAC layer. These include, but are not limited, to Carrier Sensing Multiple Access (CSMA), Frequency Division Multiple Access (FDMA) and Time Division Multiple Access (TDMA).

While standards and protocols have provided for significant improvement in the control of voice and data traffic, the continued increase in the demand for network access at increased channel rates while supporting quality-of-service (QoS) requirements have required a continuous evaluation of protocols and standards and changes thereto. For example, much effort has been placed on support for real-time multimedia services in WLAN's, particularly with Quality of Service (QoS) guarantees.

Although it is advantageous to allow devices operating according to a variety of wireless protocols to co-exist (i.e., to share the same frequency band, time and space of a network) their mutual co-existence is in no way guaranteed by known technologies. To wit, collisions may occur between voice and data from the various devices within the network using the different MAC protocols. Ultimately, these and other shortcomings of known wireless systems adversely impacts the QoS or performance of the network.

What is needed, therefore, is a method and apparatus that substantially overcomes at least the shortcomings of known methods described.

In accordance with an example embodiment, a method of wireless communication includes providing a first wireless network of a first protocol and providing a second wireless network of at least a second protocol. The method also includes assigning at least one time slot by the first wireless network to the second wireless network during which the second wireless network may communicate with at least one device within its network.

In accordance with another example embodiment, a wireless communication system includes a first wireless network of a first protocol and a second wireless network of at least a second protocol. The second wireless network is assigned at least one time slot by the first wireless during which the second wireless network may communicate with at least one device within its network.

An apparatus, comprising:

In accordance with another example embodiment a centralized wireless network shares a medium with a distributed second wireless network, wherein the centralized wireless network allocates at least one time slot only, during which devices of the distributed second wireless network may communicate.

The invention is best understood from the following detailed description when read with the accompanying drawing figures. It is emphasized that the various features are not necessarily drawn to scale. In fact, the dimensions may be arbitrarily increased or decreased for clarity of discussion.

Figure 2:
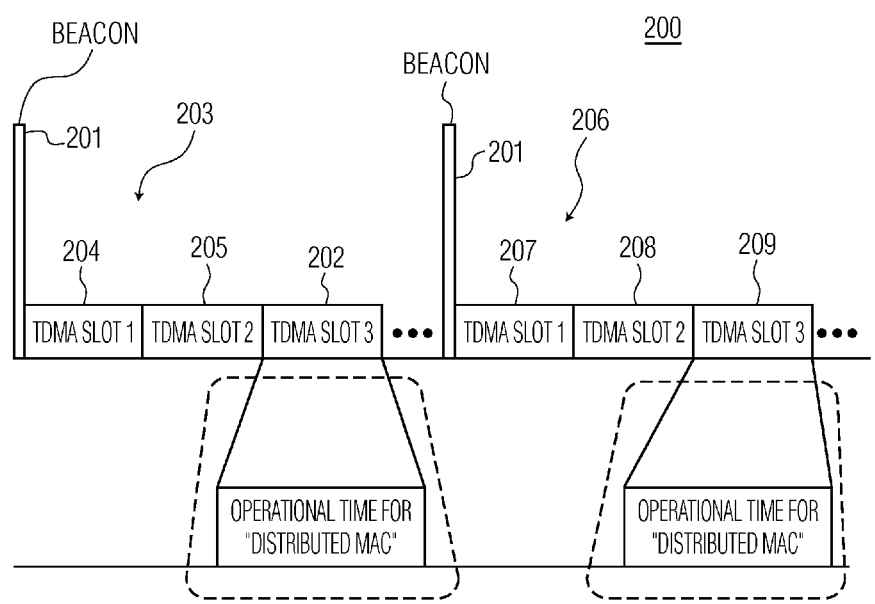
FIG. 2 is a time-line showing time allocation of various devices in a centralized TDMA wireless network, and a distributed second MAC wireless network sharing the medium with the centralized wireless network in accordance with an example embodiment.

FIG. 2 also illustrates expanded views of a time slot reserved for a distributed second MAC wireless network according to an example embodiment.

Figure 3:
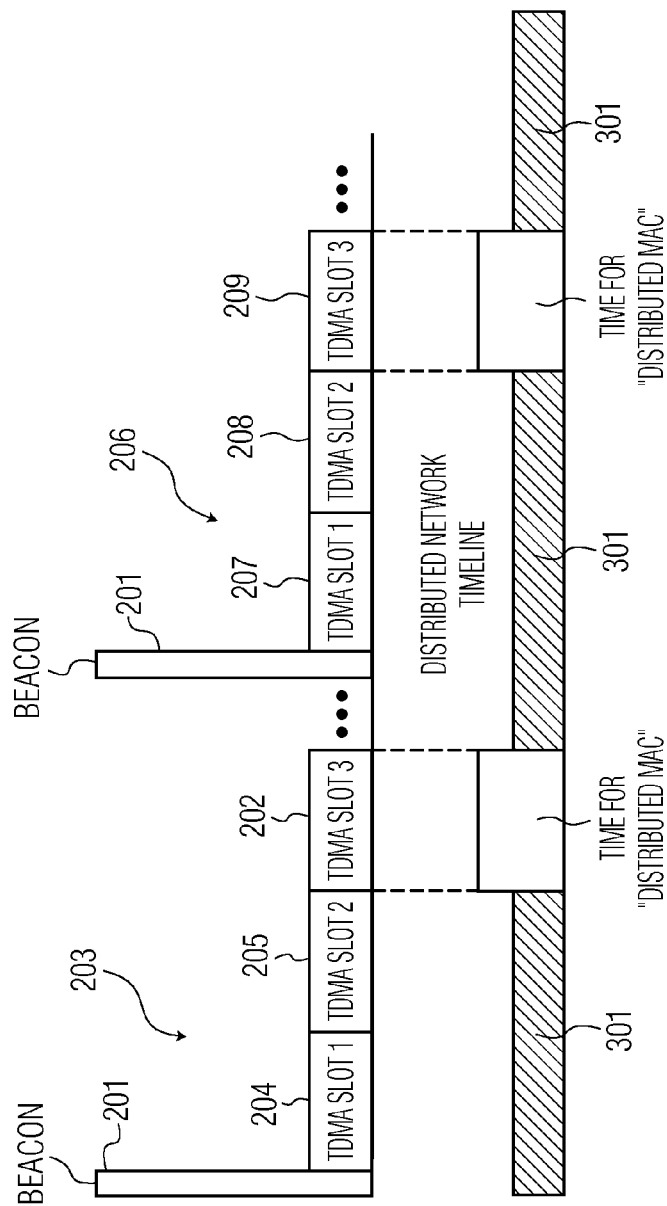

FIG. 3 is a time line showing the operational and non-operational times of a distributed second MAC network within the range of a centralized MAC network in accordance with an example embodiment.

In the following detailed description, for purposes of explanation and not limitation, example embodiments disclosing specific details are set forth in order to provide a thorough understanding of the example embodiments. However, it will be apparent to one having ordinary skill in the art having had the benefit of the present disclosure that other embodiments that depart from the specific details disclosed herein. Moreover, descriptions of well-known devices, methods, systems and protocols may be omitted so as to not obscure the description of the present invention. Nonetheless, such devices, methods, systems and protocols that are within the purview of one of ordinary skill in the art may be used in accordance with the example embodiments. Finally, wherever practical, like reference numerals refer to like features.

Briefly, in accordance with illustrative embodiments, methods and apparati provide for the sharing of a communications medium by a wireless network having a centralized MAC layer and a second wireless network having a distributed second MAC layer. Illustratively, the second network is introduced within the range of the first network and, after request for service and an acknowledge, the second network is assigned at least one time slot within a service interval of the first network in which its devices may communicate with one another and without creating collisions with or otherwise interfering with the devices or coordinator of the first network.

It is noted that in the illustrative embodiments described herein, the first network is a centralized TDMA network, and the second network may include devices functioning under other protocols in addition to TDMA, including CSMA, CSMA with collision avoidance (CSMA/CA) and frequency division multiple access (FDMA). It is emphasized that these protocols are merely illustrative and that protocols other than those specifically mentioned may be used for both the first and second networks without departing from the example embodiments.

Figure 1:
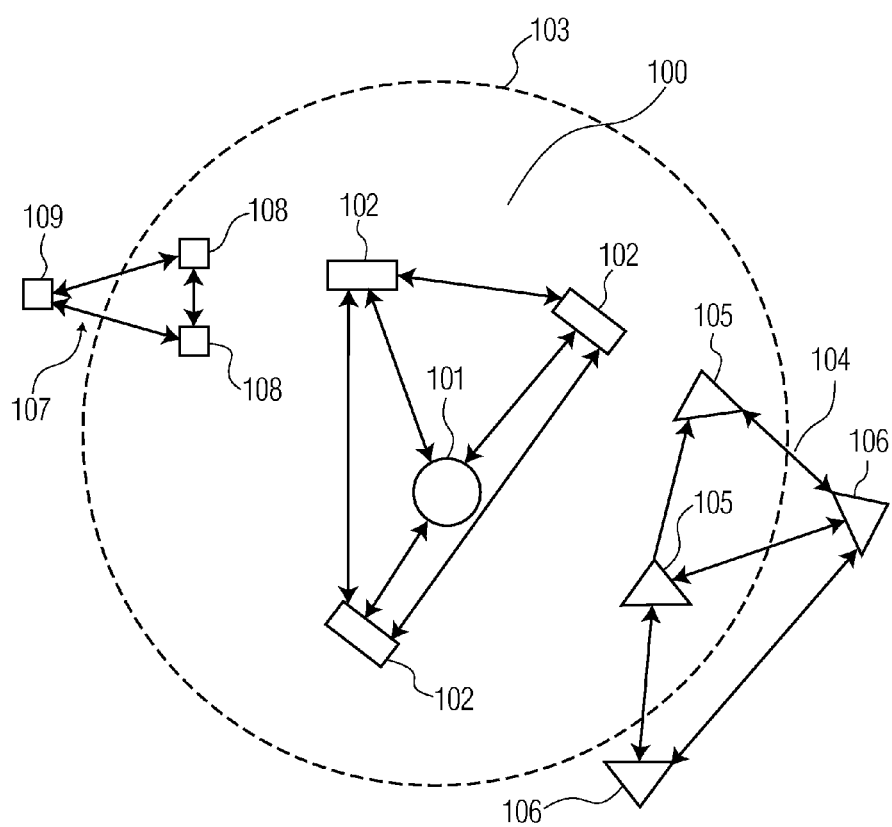
FIG. 1 is a diagram representative of wireless communication networks sharing a medium in accordance with an example embodiment.

FIG. 1 is a schematic diagram of a plurality of wireless systems sharing a communications medium (i.e., co-existing) in accordance with an example embodiment. A first wireless network 100 includes a centralized MAC layer within a host 101, which illustratively operates according to a TDMA protocol. The host 101 services a number of devices 102 according to the chosen TDMA protocol. Illustratively, the first network 100 is a WLAN, a wide area network (WAN) or mobile telephone network, and the devices 102 are computers, mobile phones, personal digital assistant (PDA), or similar device that typically operates in such networks. As indicated by the two-way arrows, the devices 102 may communicate bilaterally; and the host 101 and devices 102 may communicate bilaterally. It is further noted that according to certain MAC layer protocols, communication from one device 102 to another device 102 is not direct; rather such communications pass through the host 101, which then transmits the communications (using known scheduling methods) to the correct recipient device 102.

It is noted that while only three devices are shown, this is merely for simplicity of discussion. Clearly, many other devices 102 may be used. Finally, it is noted that the devices 102 are not necessarily the same. In fact a plethora of different devices that function under the chosen protocol may be used within the first network 100.

A second network 104 is at least partially located within the range 103 of the first network 100. The second network is illustratively, but not necessarily, mobile, having been established within the range of the first network. As indicated by the two-way arrows, the devices 105, 106 may communicate bilaterally with one another.

The second network 104 may be one of a number of protocols and includes a distributed or centralized MAC layer. The second network may function under one of a number of protocols, illustratively those referenced in connection with the embodiments of the first network 100.

The second network 104 comprises first devices 105 and second devices 106. The first and second devices 105 and 106 may be distributed MAC devices. First devices 105 are located within the range 103, and devices 106 are outside the range 103. Clearly, if first device 105 moves outside the range 103 it becomes a second device 106 of the second network 104; and if a second device moves within the range 105 it becomes a first device 105 of the second network 104. It is noted that there may be more or fewer of first devices 105 and second devices 106 than are shown. Finally, like the devices of the network 100, the first and second devices 105, 106 may be computers, PDAs, mobile phones or similar devices.

The second network 104 is a distributed or centralized network, in which at least one of the devices 105 is adapted to communicate with function under the MAC layer of the centralized network 100. To wit, and as will become clearer as the present description continues, at least one of the devices 105 will request service from the host 101, and inform other devices 105 of the receipt of an acknowledgement (ACK) from the host 101. Finally, this device 105 will command the other devices 105 to enter a non-communication (sleep) mode until the time slot for their communication designated by the host 101.

It is emphasized that in accordance with an example embodiment, a plurality of distributed networks may share the same medium. For example, a third network 107, which is a distributed or centralized network, includes devices 108 within the range 103 of the first network 101, and a device 109 outside the range 103. This device may include the same types of devices and may function according to protocols discussed in connection with the second network 104. Moreover, and as will become clearer as the present description continues, the third (and any additional distributed networks) share the same medium with the first network 101 by reserving it own time slot within each desired service interval.

It is noted that a function of the third network 107 within the common medium as the first network 101 is substantially the same as that described in connection with second network 104. As such, certain duplicative details the function of the third network is omitted in the interest of clarity, with the understanding that the description of methods and devices (and variants thereof) of the second network 104 applies to the third (and additional) network 107.

FIG. 2 is a timeline 200 in accordance with the example embodiment, and is best understood when reviewed in conjunction with the illustrative embodiments of FIG. 1. At selected intervals the host 101 of the first (centralized) network 100 sends a beacon 201. As is known, the beacons define the beginning of a service interval. Under a TDMA MAC protocol as well as other protocols, the beacon 201 is received within the range 103 of the network, and upon receipt by the devices 102, requests for service are made by the devices 102. The host 101 then sends an ACK to each device designating the time slot (commencement time and duration) it has been granted for servicing by the host 101. Of course, this servicing includes the communication between the host 101 and the particular device 102, as well as communication between the particular device 102 and another device 102 of the network.

As can be appreciated, that this process continues while one or more of the devices remain in the range 103 of the host 101. For example, as shown, upon termination of a first service interval 203, another beacon 201 is transmitted indicating the commencement of a second service interval 206. As with the first service interval 203, certain devices 102 of the first network are granted slots 207 and 208, while the second network 104 is granted its slot 209. Thus, there may be a plurality of successive service intervals, each of which commences with a beacon 201. Moreover, it is noted that the order and quantity of the time slots of FIG. 2 are merely illustrative. Finally, it is noted that additional slots may be included in each service interval, and the second network may be granted additional time slots (not shown) within the same service interval.

As referenced previously, by some protocols, all communication from one device 102 to another is routed through the host 101, and the host may retain the data/voice from the transmitting device 102 until the service interval with the other device 102 of the network is initiated. As the details of such known protocols are within the purview one of ordinary skill in the wireless communication arts, further discussion of these details is omitted so as to not obscure the description of the example embodiments.

In accordance with an example embodiment, one of the devices 105 of the second network 104 negotiates with the host 101 of the first network 100 for allocation of a time slot in a particular service interval. For example, in the time line of the example embodiment of FIG. 2, the time slot 202 of the first service interval 203 is allocated to the second wireless network 104, which may be distributed or centralized. The other time slots 204 and 205 shown are reserved by selected devices 102 of the first network 100.

The negotiation for a time slot between a device 105 of the second network with the host 101 follows the rules of the TDMA protocol used in network 100. Once the negotiation is finished, the device 105 transmits the 'results' of the negotiation and the commencing time and duration of the time slot assigned to the rest of devices 105 and 106 in the second network 104.

As shown in expanded view in FIG. 2, during the slot 202 assigned to the second network the devices 105, 106 of the first network 104 communicate with one another under the guidelines of the governing MAC protocol. In the distributed second network, a wide variety of MAC protocols may be used. To wit, the devices 105, 106 of second network 104 may function under one or more MAC protocols. Beneficially, there is substantially no risk of collisions with the devices 102 of the first network because the time slot 202 has been previously allocated and none of the other devices 102 are permitted to transmit in the first network 100. As such, the rules defined by the MAC layer of the second network 104 apply during the time slot 202.

The requested slot duration of the slot 202 by the second network 104 may vary depending on the MAC protocol(s) used in this distributed second network. For example it may be useful to request a slot duration that it is a multiple of a service (beacon) interval used in the second network 104. This may increase efficiency and facilitate the operation in the distributed network.

FIG. 3 shows a timeline showing the non-operational times 301 of the second network 104. The non-operational times 301 are recognized by the devices 105 and 106 during which the second network 104 must be inactive in order to prevent collisions with transmissions from the devices 102 of the first network. These non-operational times are set by the device(s) 105 that negotiate the cohabitation co-existence of the second and first networks during the initial handshake. To wit, the device 105 transmits the time slot for the second network and simultaneously sets the non-operational time slots 301 with each of the other devices 105, 106. According to this technique of an example embodiment, the devices 105 and 106 of the second network 104 are on notice that a certain period of time cannot be used for operation. This can be done for example by "marking" the remaining time as "busy." This mechanism guarantees co-existence by sharing the total time available between the two distinct networks. The time 301 can be marked as busy by device 105 following several protocols, including the NAV virtual protection defined in IEEE 802.11, slot allocations of TDMA protocols, etc. . . .

In view of this disclosure it is noted that the various methods and devices described herein can be implemented in hardware and software known to achieve sharing of a medium between a centralized wireless network and at least one other distributed wireless network within the range of the centralized wireless network. Further, the various methods and parameters are included by way of example only and not in any limiting sense. In view of this disclosure, those skilled in the art can implement the various example devices and methods in determining their own techniques and needed equipment to effect these techniques, while remaining within the scope of the appended claims.

The invention claimed is:

1. A method of wireless communication, the method comprising:
providing a first wireless network comprising at least one first host configured to communicate with a plurality of first devices, wherein the first wireless network is configured to operate according to a first protocol;
providing a second wireless network, which is configured to operate according to at least a second protocol, said second wireless network comprising a plurality of second devices, at least one second device being within a range of the first wireless network;
negotiating, by the at least one second device, with said first host for allocation of a time slot of one of the plurality of first devices in accordance with the first protocol; and
assigning the time slot of said one of the plurality of first devices in a service interval of the first wireless network to the second wireless network, wherein during said assigned time slot the at least one second device of the second wireless network is configured to communicate with at least one other second device of the second wireless network.

2. The method of claim 1, wherein the first wireless network is a centralized network.

3. The method of claim 1, wherein the second wireless network is one of a distributed wireless network and a centralized wireless network.

4. The method of claim 1, wherein the first protocol is a time division multiple access (TDMA) protocol.

5. The method of claim 1, wherein the assigning further comprises:
providing at least one negotiating device in the second wireless network, which transmits a request for service from the at least one first host, and wherein, in response to said request, the at least one first host transmits an acknowledgement, which includes an assignment of the time slot to the second wireless network.

6. The method of claim 1, wherein the method further comprises;
providing a plurality of other networks, which share a medium with the first and second wireless networks; and
assigning at least one distinct time slot in the service interval of the first wireless network to each of the plurality of wireless networks.

7. The method of claim 1, wherein the assigning of the time slot is repeated in a plurality of service intervals.

8. The method of claim 3, wherein the distributed or centralized wireless network is adapted to function according to one or more of the following protocols: TDMA, FDMA, IEEE 802.11, Bluetooth, Hyperlan, GSM, Ethernet, CSMA or CSMA/CA.

9. The method of claim 3, wherein the distributed or centralized wireless network includes a plurality of devices and the distributed or centralized wireless network is one of: a WLAN; a WAN; a wireless personal audio network (WPAN), or a mobile telephone network.

10. A wireless communication apparatus, comprising:
a first wireless network comprising at least one first host configured to communicate with a plurality of first devices, wherein the first wireless network is configured to operate according to a first protocol; and
a second wireless network, which is configured to operate according to at least a second protocol, said second wireless network comprising a plurality of second devices, at least one second device being disposed within a range of the first wireless network;
the at least one second device is configured to negotiate with said first host for allocation of a time slot of one of the plurality of first devices in accordance with the first protocol; and
wherein at least one time slot in one or more service intervals of the first wireless network is assigned by the first host to the second wireless network, wherein during said assigned time slot at least one second device of the second wireless network is configured to communicate with at least one other second device of the second wireless network.

11. The apparatus of claim 10, wherein the first wireless network is a centralized network.

12. The apparatus of claim 10, wherein the second wireless network is one of a distributed wireless network and a centralized wireless network.

13. The apparatus of claim 10, wherein the first protocol is a time division multiple access (TDMA) protocol.

14. The apparatus of claim 12, wherein the distributed or centralized wireless network is adapted to function according to one or more of the following protocols: TDMA, FDMA, IEEE 802.11, Bluetooth, Hyperlan, GSM, Ethernet, CSMA or CSMA/CA.

15. The apparatus of claim 10, wherein at least one device of the second wireless network is adapted to negotiate with a host of the first wireless network to schedule the at least one time slot.

16. The apparatus of claim 10, further comprising a plurality of other wireless networks, which share a medium with the first and second wireless networks, wherein at least one distinct time slot in the service interval of the first wireless network is assigned to each of the plurality of wireless networks.

17. The apparatus of claim 12, wherein the distributed or centralized wireless network includes a plurality of devices and the distributed wireless network is one of: a WLAN; a WAN; a WPAN or a mobile telephone network.

18. The method of claim 7, wherein a beacon commences each of the plurality of service intervals.

19. The apparatus of claim 10, wherein the first and second networks function in a plurality of service intervals.

* * * * *